United States Patent
Pfeffer

(10) Patent No.: US 7,328,607 B2
(45) Date of Patent: Feb. 12, 2008

(54) BRAKE LINING MONITORING DEVICE AND METHOD

(75) Inventor: Axel Pfeffer, Berlin (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/501,064

(22) PCT Filed: Jan. 10, 2003

(86) PCT No.: PCT/US03/00693

§ 371 (c)(1),
(2), (4) Date: Dec. 8, 2004

(87) PCT Pub. No.: WO03/059713

PCT Pub. Date: Jul. 24, 2003

(65) Prior Publication Data

US 2005/0109090 A1    May 26, 2005

(30) Foreign Application Priority Data

Jan. 11, 2002 (DE) ................. 102 00 877

(51) Int. Cl.
*F16D 66/02* (2006.01)
(52) U.S. Cl. ................. 73/129; 188/1.11 L; 340/454
(58) Field of Classification Search ................. 73/121, 73/128, 129, 130; 188/1.11 R, 1.11 W, 1.11 L, 188/1.11 E; 340/453, 454
See application file for complete search history.

(56) References Cited

U.S. PATENT DOCUMENTS

| | | | | |
|---|---|---|---|---|
| 3,740,566 A | * | 6/1973 | Newstead | 307/10.1 |
| 3,802,257 A | * | 4/1974 | Jorenda et al. | 73/129 |
| 3,975,706 A | * | 8/1976 | Kato | 340/454 |
| 5,637,794 A | * | 6/1997 | Hanisko | 73/121 |
| 5,835,009 A | * | 11/1998 | Hanisko | 340/454 |
| 6,302,241 B1 | | 10/2001 | Gronowicz, Jr. | |
| 6,384,721 B1 | | 5/2002 | Paielli | |
| 2004/0069573 A1 | * | 4/2004 | Anderson | 188/1.11 L |

\* cited by examiner

*Primary Examiner*—Eric S. McCall

(57) ABSTRACT

A method of monitoring the functionability of a brake lining (10, 12) comprising the following steps: measuring a value that characterizes the dielectric constant of the lining material; comparing the measured value with a reference value for the new material; and determining the functionability when the measured value is within a specified tolerance range.

7 Claims, 2 Drawing Sheets

BRAKE LINING MONITORING DEVICE AND METHOD

The present invention concerns a method of monitoring the functionability of a brake lining and particularly its application to elevator brakes. Mechanical brakes such as for example drum brakes or disk brakes are extensively used in the technology. Such brakes are generally well known, particularly in vehicle manufacture. But mechanical brakes are also frequently used in passenger conveyors and especially in elevators. Such mechanical brakes are generally very safe and reliable. Typical problems are brake lining wear and brake lining contamination, where the latter is generally most problematic when the contamination is caused by fluids, such as oil and water e.g.

BACKGROUND OF THE INVENTION

Monitoring devices to determine brake lining wear have already been proposed. Thus it is known from vehicle manufacture to include a conductor in the brake lining material so that it is ground through with corresponding wear of the brake lining material due to braking. Once this conductor is ground through, the resistance is infinite when the brake is raised, i.e. when the brake lining does not contact the brake disk or the brake drum, and a certain finite resistance exists when the brake is in use, i.e. when the brake lining contacts the brake disk or the brake drum. In the presence of a predetermined wear condition, this monitoring device permits to generate a warning signal which informs the user of an impending brake lining change. However, this monitoring device is unable to detect a condition in which the brake lining has become nonfunctional due to contamination.

This has caused big problems, particularly in elevators. They typically have an electromagnetically activated brake as a component of the motor unit, which is used to hold the car when it stands still at a landing. These brakes are typically drum brakes, where the brake linings act on a brake drum from the outside and are pulled into the braking condition by a spring. A solenoid is used to raise the brake. The car can move when the brake is raised. This brake is extremely important because the electric motors or any interposed gears cannot exert sufficient braking action for a standstill. During a brake failure the car moves either up or down depending on whether the counterweight is lighter or heavier than the car plus its load. Since the car door and the shaft door are typically open in this condition, it can be a highly dangerous situation for the passengers in the car. In addition there is the danger of a crash when the car suddenly moves due to load changes during loading and unloading. Such situations have already occurred in the past, but fortunately without serious consequences in most cases. The cause of the brake failure in the majority of cases was brake linings soaked with lubricants which had leaked from the motor unit.

Unlike in motor vehicles where the driver can detect a gradual failure of the braking effect by a "spongy" feeling, the situation with elevators is that there is typically a sudden failure unless the elevator installation has been serviced by chance, when a beginning contamination of the brake would be detected.

It is therefore the objective of this invention to provide a method of monitoring the functionability of a brake lining, whereby in particular an impending brake failure due to contamination can be detected in time.

BRIEF SUMMARY

The invention achieves this objective by a method that includes the following steps: measurement of a value which characterizes the dielectric constant of a lining material; comparing the measured value with a reference value for the new material; and determining the functionability when the measured value is within a specified tolerance range.

The invention utilizes the knowledge that during capital brake failures until now the brake linings were not only contaminated to a relatively small degree, but the fluid had massively soaked through the relatively soft brake lining material. This means undoubtedly that small amounts of oil leaking on the brake lining do not create any great problem during normal brake operation. Only if greater amounts of oil continuously leak onto the brake lining will the oil gradually soak through and finally cause a sudden brake failure. Such a soaked-through condition of the brake lining causes a considerable change in the dielectric constant of the brake lining, so that an incipient brake failure can be detected by this change in the dielectric constant. The specified tolerance range can be determined by line tests. Particularly the dependence of the brake's holding force can be determined from the dielectric constant, and a tolerance range can then be specified by starting with a satisfactory brake function. This tolerance range can be determined for different applicable contaminants, especially lubricants and water.

It should be noted that it is not absolutely necessary to determine the dielectric constant in numerical form. It is rather essential to determine a characteristic value for the dielectric constant, which can be compared to a corresponding reference value.

The characteristic value for the dielectric constant is preferably determined by a static capacitance measurement. The capacitance of two conductors between which the brake lining material is located is particularly easy to measure in a technical manner. It is an advantage if at least one of the conductors is located in the brake lining material. Preferably a conduction measurement is also performed on the at least one conductor, i.e. the conductor's resistance is measured. With a corresponding wear of the brake lining this conductor in the brake lining is ground through, and during the conduction measurement its resistance approaches infinity, thus a resistance measurement, which shows a resistance approaching infinity, is an indication that the brake lining is very worn and must be replaced. Thus such a worn condition of the brake lining shows a measured capacitance value of zero, where this capacitance changes suddenly. Accordingly it is also possible to determine if the brake lining is worn by only performing a capacitance measurement.

The method preferably includes the step of providing the brake lining with two conductors inside the brake lining. The capacitance measurement can be performed between the two conductors.

The invention also concerns a brake lining containing at least two conductors arranged in the lining material so that the conductors can be used to perform a capacitance measurement. The two conductors can pass through the brake lining along an essentially straight line. But they can also be placed to engage each other in loops for example, so that the first and second conductors run alternatingly in parallel with each other in the brake lining. This "narrow" arrangement of the first and second conductor considerably increases the capacitance of the "condenser" formed by the two conductors, so that capacitance changes are easier to prove.

Preferably the conductors are arranged in a plane which runs essentially parallel to the braking surface of the brake lining. The conductors are preferably made of a foil material. It is relatively easy to insert the foil material into the lining material during the manufacture of the brake lining.

Preferably the conductors are imbedded in the brake lining material so that lining material is present on both sides of the conductors in the wear direction of the brake lining. This ensures that sufficient brake lining material is still available after a worn condition has been detected, and the function of the brake is assured for some time after this wear condition has been detected.

The invention furthermore concerns a brake comprising a brake lining monitoring device, which is designed to determine the functionability of the brake lining based on changes in the dielectric constant of the brake lining.

Preferably the brake has a lining in accordance with the invention, comprising at least two conductors located in the brake lining. As an alternative the brake includes a device whereby a dynamic value which characterizes the dielectric constant can be measured, for example by transmitting an electromagnetic signal to the brake lining material.

Preferably the brake lining monitoring device has a resistance which forms an oscillating circuit in conjunction with the capacitance emitted by the at least two conductors, and furthermore preferably has an evaluation circuit able to measure the natural frequency of the oscillating circuit. If the capacitance of the brake lining material changes, for example because a fluid has seeped into the brake lining material, its capacitance changes and thus the frequency of the oscillating circuit as well.

The invention furthermore concerns an elevator installation comprising a brake according to the invention. It is an advantage if the signals from the brake lining monitoring device are relayed to the elevator control. Depending on the determined condition of the brake lining material, the elevator control can for example emit a warning signal and send a message via a remote service connection that a worn lining must be replaced, or with changes in the dielectric constant or the capacitance which point to a harmful contamination of the brake lining function, the elevator can be taken out of service and the remote service connection can also send a corresponding message to the service department.

BRIEF DESCRIPTION OF THE DRAWINGS

The invention and configurations of the invention are explained in the following by means of an embodiment, where.

DETAILED DESCRIPTION OF THE PREFERRED EMBODIMENTS

Figure 1:
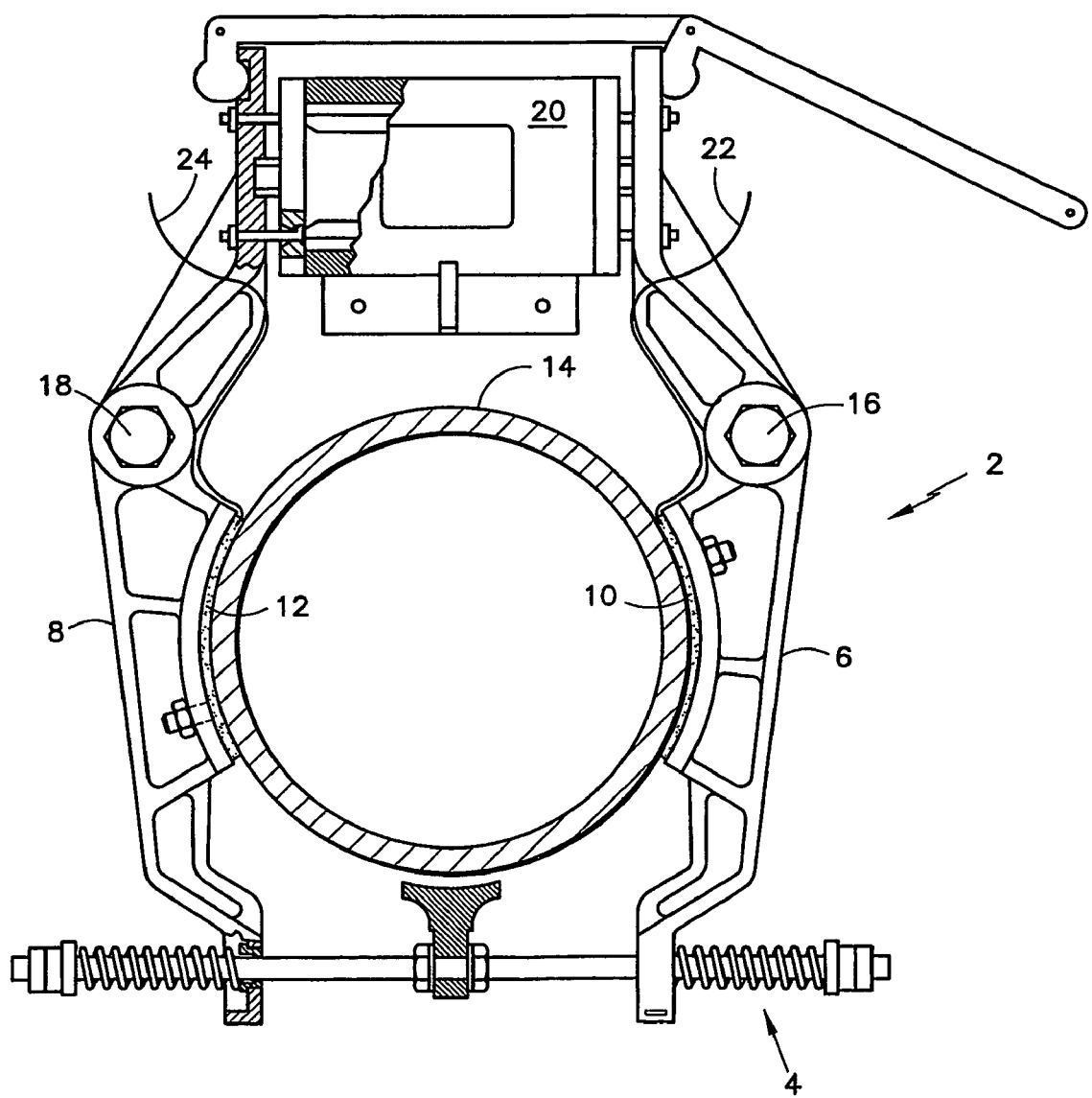
FIG. 1 is an elevator brake according to the invention.

FIG. 1 shows an elevator brake 2 comprising two brake shoes 6 and 8 pulled in the activation direction by a spring arrangement 4. Each of the brake shoes 6, 8 has a brake fining 10, 12 attached for example by glue, rivets, etc. In the activated position the brake surfaces of linings 10, 12 contact the perimeter of a brake drum 14.

Each of the brake shoes 6, 8 can rotate around a bolt 16, 18. A solenoid 20 works with the brake shoes 6, 8 and is used to raise the brake, i.e. when the solenoid is energized it raises the brake linings 10, 12 from the brake drum 14 so that the pertinent shaft can rotate.

The elevator brake 2 is typically used to hold the car when it stops at a floor landing. The car and the counterweight are usually balanced when the car contains half of its permissible load. The braking forces normally exerted by the brake are therefore relatively small. In general the size of the elevator's drive unit is such that it can move the elevator in the shaft without any problems, even when the brake 2 is applied. In that case there is typically very heavy wear of the brake lining, which can lead to a brake failure in a short time. Monitoring the wear condition of the brake lining is therefore advantageous. Another source of errors is that contamination, for example lubricants such as oil or grease, or water can leak on the brake lining 10, 12. When a certain contamination condition is reached, the brake is no longer able to hold the car at a landing and the result is an uncontrolled travel movement, which in most cases takes place when the car door and the shaft door are open, with a corresponding high risk of injury to the passengers in the car, and any passengers standing in the open shaft door. To prevent such a condition the brake 2 contains a brake lining monitoring device, which essentially comprises brake linings 10, 12 that are able to detect a corresponding contaminated condition, and a control. The detection of the contaminated condition takes place in particular by measuring the dielectric constant of the brake lining, or by measuring capacitance. FIG. 1 shows lines 22, 24 which conduct signals from the brake linings to a (not illustrated) control. This may either be the elevator control which is equipped with a corresponding function for evaluating the measured values, or it can be a control assigned to the brake which only transmits signals to the elevator control.

Figure 2:
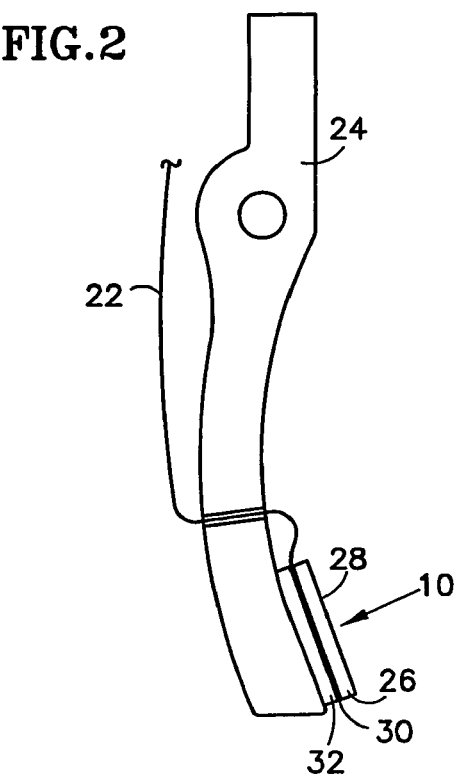
FIG. 2 is an enlarged illustration of a brake shoe with a brake lining according to the invention.

FIG. 2 shows a brake shoe 24 which differs only slightly from brake shoes 6, 8. The essential part of FIG. 2 is the brake lining 10 from which line 22 emerges. The multilayer construction of the brake lining 10 can be recognized. The brake lining 10 particularly has an outer brake lining layer 26 whose braking surface 28 is arranged in the brake drum direction. In addition an intermediate (bold) layer 30 can be recognized, in which conductors for measuring the capacitance/dielectric constant are located. Another layer 32 of brake lining material which is located deeper can also be recognized, it is used as a "reserve layer" when the outer layer 26 is worn off.

The conductor layer 30 can either be a flat layer which is inserted between the outer brake lining layer 26 and layer 32 during manufacture of the brake lining 10, for example by gluing, sintering, etc. As an alternative it is also possible to locate individual conductor tracks between the layers 26 and 32. During the manufacture of the brake lining 10, which typically takes place by compressing and sintering an essentially powdery lining material, it is also possible to integrally arrange a flat conductor layer or individual conductors respectively, and to reform the raw material into the brake lining 10 by compressing and sintering it, or by other suitable processes.

Figure 3:
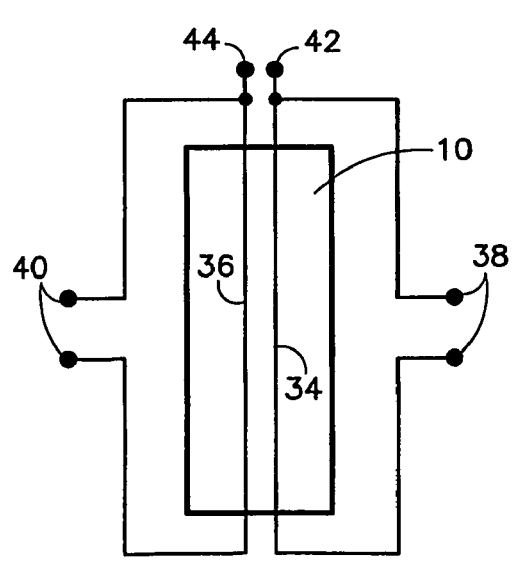
FIG. 3 is a possible conductor arrangement according to the invention.

FIG. 3 very schematically shows a conductor arrangement for a brake lining 10. The view in FIG. 3 is a section in the plane of the conductor layer 30, so that the path of the conductors in the brake lining 10 itself can be seen. It can especially be recognized that two conductors 34 and 36 are arranged to run essentially parallel in the brake lining 10.

The resistance through the conductors can be measured between the pair of terminals 38 and between the pair of terminals 40. The resistance is typically the conductor resistance as long as an external lining layer 26 is present. If the external layer 26 of brake lining 10 is ground off or worn, one of the conductors 34, 36 or both conductors are damaged, so that the resistance essentially approaches infinity when the brake is raised, while the resistance with the applied brake is significantly lower. The current is then able to flow through the conductor ends and the brake drum. The capacitance, and thus a relative value for the dielectric constant of the brake lining material, can be measured between the conductor ends 42 and 44. The penetration of contaminants into the lining material leads to a change in the dielectric constant of the brake lining material, or to a change in the capacitance of the device. Starting with a reference value for "clean" brake lining material, a threshold value can be determined beyond which the brake lining is considered functionally unusable and the brake is turned off. The threshold value can for example be stored in a memory provided in the control. Alternately an electronic circuit can be used to indicate that a threshold defined by the circuit has been exceeded. It is also possible to define a first and a second threshold value. The first threshold value can be used to transmit a service notice to the elevator service department, for example via a remote service connection. The second threshold value can then transmit a signal to the elevator control whereby the elevator is taken out of service in a defined manner, i.e. the elevator travels to the next possible stop, where it stops and moves no further from that location.

Figure 4:
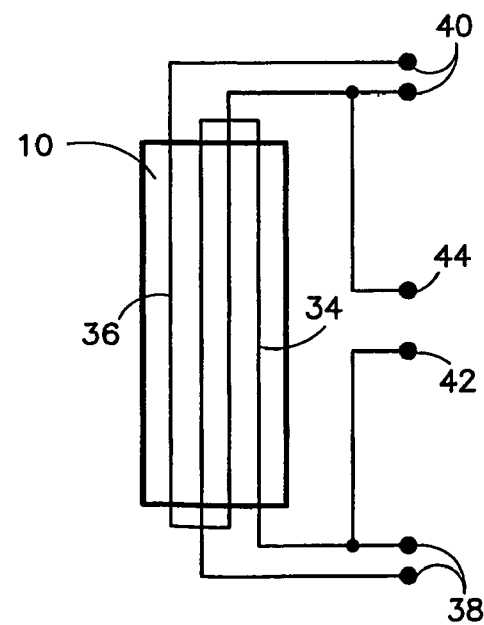
FIG. 4 is an alternative conductor arrangement according to the present invention.

FIG. 4 shows a schematic circuit arrangement which somewhat resembles the arrangement in FIG. 3. In contrast to the arrangement in FIG. 3, the conductor tracks 34, 36 are arranged in loops or they meander in the brake lining 10. This increases the condenser's capacitance and changes can easily be detected. If desired, the conductors 34, 36 can also pass more than twice through the brake lining 10, i.e. more than through one loop.

In the cases of FIGS. 3 and 4, if the brake lining 10 is worn down to the conductors 34, 36 and the brake is applied, although a less than infinite resistance can be measured, a capacitance that is essentially zero is however measured. When the brake is raised, the capacitance is greater than zero but the resistance approaches infinity. With increasing contamination, or if lubricant or water has soaked the brake lining, the capacitance changes due to the changing dielectric constant between the conductors 34, 36. This change in capacitance can be evaluated, as described earlier. In that case the resistance does not change. It is an advantage if the control of brake 2 emits warning signals when the capacitance changes, an infinite resistance is measured and/or a zero capacitance is measured.

The invention claimed is:

1. A method of monitoring the functionability of a brake lining, comprising the following steps:
   measuring a value that characterizes the dielectric constant of the lining, wherein the lining is provided between a first, pressing braking member and a second, pressed braking member;
   comparing the measured value with a reference value for the lining; and
   determining the functionability when the measured value is within a specific tolerance range,
   wherein, when the brake is actuated, the lining contacts the first, pressing braking member and the second, pressed braking member,
   wherein the lining includes a braking surface,
   wherein at least one conductor is arranged in the lining, and
   wherein the at least one conductor is substantially arranged in a plane, which plane is substantially parallel to the braking surface of the brake lining.

2. A method as claimed in claim 1, wherein the measured value is determined by a static capacitance measurement.

3. A method as claimed in claim 1 or 2, further comprising the step of performing a conduction measurement.

4. A method as claimed in one of claims 1 to 2, further comprising the step of providing at least two conductors located in the lining.

5. A brake comprising:
   a first, pressing braking member;
   a second, pressed braking member;
   a brake lining provided between the first and second braking members, the brake lining comprising a brake lining material; and
   a brake lining monitoring device which is constructed so that it can determine the functionability of the brake lining on the basis of a change in the dielectric constant of the brake lining material,
   wherein, when the brake is actuated, the lining is configured to contact the first, pressing braking member and the second, pressed braking member,
   wherein the lining includes a braking surface,
   wherein at least one conductor is arranged in the lining, and
   wherein the at least one conductor is substantially arranged in a plane, which plane is substantially parallel to the braking surface of the brake lining.

6. A brake comprising:
   a brake lining comprising:
      a lining; and
      at least two conductors arranged in the lining in a way so that the conductors can be used to perform a capacitance measurement; and
   a brake lining monitoring device which is constructed so that it can determine the functionability of the brake lining on the basis of a change in the dielectric constant of the brake lining,
   wherein the lining is configured to be provided between a first, pressing braking member and a second, pressed braking member,
   wherein the lining includes a braking surface, and
   wherein the conductors are substantially arranged in a plane, which plane is substantially parallel to the braking surface of the lining.

7. A brake as claimed in claim 6, wherein the brake lining monitoring device comprises a resistance which, in conjunction with the capacitance emitted by the at least two conductors forms an oscillating circuit.

* * * * *